April 7, 1936.  F. B. WALDRON  2,036,900

GLASS GRINDING APPARATUS

Filed March 9, 1935

Frederic Barnes Waldron, INVENTOR,

By Morrison, Kennedy & Campbell, his Attorneys.

Patented Apr. 7, 1936

2,036,900

UNITED STATES PATENT OFFICE 2,036,900

GLASS GRINDING APPARATUS

Frederic Barnes Waldron, Prescot, England, assignor to Pilkington Brothers Limited, Liverpool, England Application March 9, 1935, Serial No. 10,153
In Great Britain February 20, 1935

3 Claims. (Cl. 51—80)

This invention relates to continuous glass grinding apparatus and has for its object an improved driving means for the glass.

In grinding apparatus for a strip of glass which is not supported on tables, but is driven through the apparatus by pairs of rollers, the difficulty has been found that the strip of glass does not keep central in the apparatus. Since the edges of the strip are not always rectilinear, it is not possible to maintain the strip central by devices engaging the edges.

According to the invention, the pairs of rollers serving to drive the glass through the apparatus are mounted so that they can be adjusted to operate at a slight angle to the direction transverse of the strip. It has been found that by this means the strip can be moved towards one side or the other of the apparatus and can, therefore, by suitably adjusting the angle at which the rollers operate, be maintained central in the apparatus. Preferably, the pairs of rollers are driven at one end, and, at the other end, their bearings are adjustable in position longitudinally of the strip.

Figure 1:
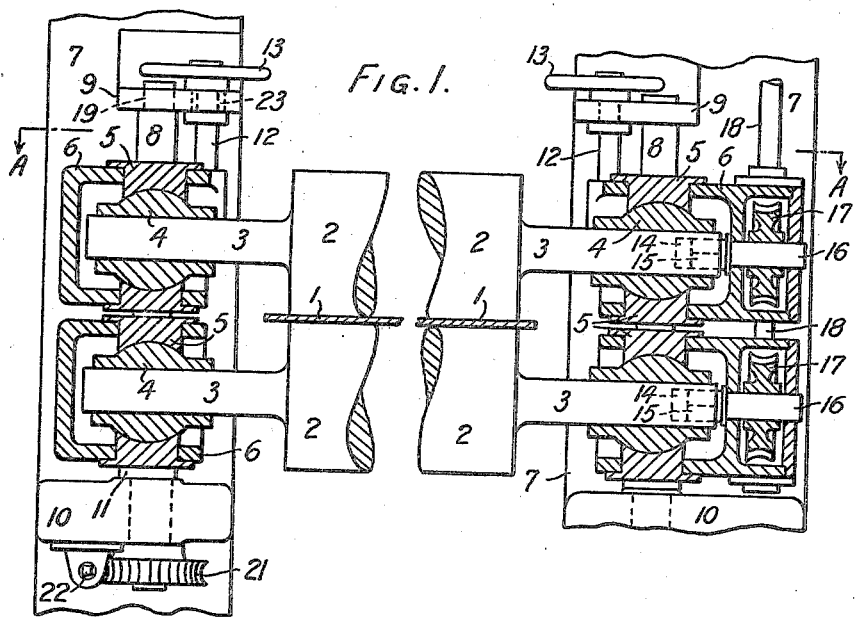
Figure 2:
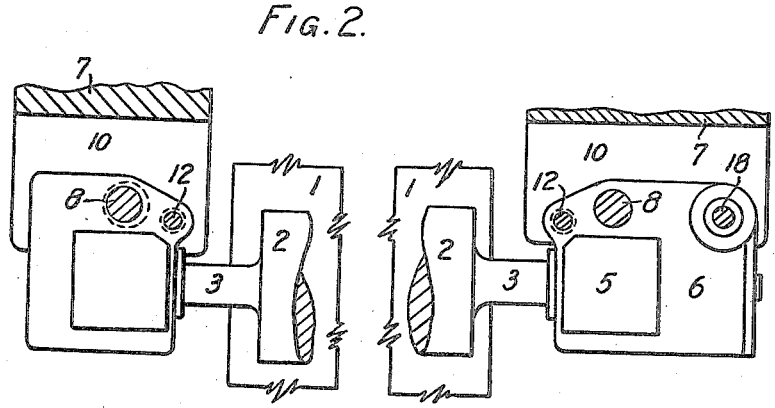

In the accompanying drawing:

Figure 1 is a vertical section through a pair of rollers (broken away at the centre) and their bearings and driving mechanism, and Figure 2 is a horizontal section through the line A—A of Figure 1.

Referring to the drawing, the strip of glass 1 is gripped between the two rollers 2. The shafts 3 of the rollers 2 turn in bearings 4 which are held in spherical cups 5 fixed to casings 6. The casings 6 are supported on the columns 7 of the apparatus by means of vertical rods 8 passing through the casings 6 and through upper brackets 9 and lower brackets 10 on the columns 7. The lower casings 6 rest on collars 11 on the rods 8, and the upper casings are adapted to slide vertically on their rods.

Shafts 12, with hand wheels 13, turn in the brackets 9 and, at their lower ends are screw-threaded and engage the upper casings 6. By turning the shafts 12, the upper roller can be raised clear of the glass.

The shafts 3 at the right hand end of the rollers 2 are provided with square holes 14 in which engage the square end 15 of short shafts 16 turning in the casings 6. Worm wheels 17 are mounted on the shafts 16 and are driven by worms on a vertical shaft 18. The square ends 15 fit the square holes 14 with sufficient freedom to permit a small angular movement of the rollers, while the right hand bearings 4 turn in the spherical cups 5.

The rod 8 at the right hand is fixed in the brackets 9 and 10, but, at the left hand it terminates above and below in eccentric pins 19 and 20 respectively adapted to turn in the brackets 9 and 10 respectively. A worm wheel 21 is fixed on the pin 20 and is engaged by a worm on the shaft 22. By rotating the left hand rod 8 by means of the worm wheel 21, it is moved eccentrically on the pins 19 and 20 carrying with it the left hand casings 6. The roller shafts 3 are free to move a small amount endwise in their bearings 4, so the eccentric movement of the casings 6 imparts to the left hand ends of the rollers a movement longitudinal of the strip, and the rollers thereby can be adjusted into a position at a slight angle to the direction transverse of the strip. The shaft 12, at the left hand end, passes through a hole 23 in the bracket 9, large enough to permit the eccentric motion of the casings 6.

It is not essential that all the pairs of rollers should be adjustable angularly, but preferably the majority of the pairs at the starting end of the apparatus are so adjustable.

Having described my invention, I declare that what I claim and desire to secure by Letters Patent is:—

1. Apparatus for grinding a strip of glass, comprising a plurality of pairs of rollers, means for pressing together the two rollers of each pair to grip the strip between them, means for driving at least one roller of each pair and means for adjusting in the plane of the strip at least one pair of the pairs of rollers angularly with reference to the direction transverse of the strip.

2. Apparatus for grinding a strip of glass comprising a plurality of pairs of rollers, means for pressing together the two rollers of each pair to grip the strip between them, means for driving at least one roller of each pair at one end and means for giving the bearings of the two rollers of at least one pair at the other end a movement comprising a movement longitudinal of the strip.

3. Apparatus for grinding a strip of glass comprising a plurality of pairs of rollers, means for pressing together the two rollers of each pair to grip the strip between them, means for driving at least one roller of each pair at one end, bearings for the two rollers of at least one pair at the said end capable of a small angular movement horizontally and means for giving the bearings of the two rollers of at least one pair at the other end a movement comprising a movement longitudinal of the strip.

FREDERIC BARNES WALDRON.